US006778064B1

(12) United States Patent
Yamasaki

(10) Patent No.: US 6,778,064 B1
(45) Date of Patent: Aug. 17, 2004

(54) COMMUNICATION DEVICE COMPRISING PORTABLE TRANSMITTER IN WHICH ID CODE IS REGISTERED AFTER MANUFACTURING

(75) Inventor: Shigenori Yamasaki, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 319 days.

(21) Appl. No.: 09/687,726

(22) Filed: Oct. 12, 2000

(30) Foreign Application Priority Data

Oct. 13, 1999 (JP) .......................................... 11-291506

(51) Int. Cl.[7] .......................... G05B 19/00; G06F 7/00; G08B 29/00; H04B 1/00; H04Q 9/00

(52) U.S. Cl. ..................................... 340/5.21; 340/5.62

(58) Field of Search .............................. 340/5.21, 5.62, 340/5.81, 5.85, 5.22, 5.23, 5.24, 5.25, 5.61, 5.63

(56) References Cited

U.S. PATENT DOCUMENTS 5,109,221 A * 4/1992 Lambropoulos et al. ..................... 340/825.69
5,278,547 A * 1/1994 Suman et al. .......... 340/825.32
5,406,274 A 4/1995 Lambropoulos et al. ..................... 340/825.69
5,693,985 A * 12/1997 Gee et al. .................... 307/9.1
5,844,517 A * 12/1998 Lambropoulos ............ 341/176
5,864,297 A * 1/1999 Sollestre et al. ....... 340/825.31
5,933,090 A * 8/1999 Christenson ........... 340/825.69
5,945,906 A * 8/1999 Onuma .................... 340/425.5
6,034,617 A * 3/2000 Luebke .................. 340/825.31

FOREIGN PATENT DOCUMENTS

EP 0 695 675 2/1996
EP 0 803 623 10/1997

* cited by examiner

*Primary Examiner*—Michael Horabik
*Assistant Examiner*—Nam Nguyen
(74) *Attorney, Agent, or Firm*—Brinks Hofer Gilson & Lione

(57) ABSTRACT

A communication device comprises: a portable transmitter which comprises operation switches, an ID code storage unit, a control unit and a transmission unit; and a receiver which comprises a receiving unit, a reference code storage unit, a control unit and a control signal generating unit capable of generating a plurality of control signals, the portable transmitter transmitting an information signal containing an ID code, the receiver comparing the ID code contained in the received information signal with a reference code, and the control signal generating unit outputting a control signal when these codes coincide with each other, wherein the portable transmitter comprises ID registration mode setting means, an ID code corresponding to the operation is formed and registered in the ID code storage unit when the control unit is set to an ID registration mode and the operation switch is operated multiple times within a predetermined ID registration mode time, and a test ID code common to a plurality of portable transmitters is already registered in the ID code storage unit.

4 Claims, 5 Drawing Sheets

COMMUNICATION DEVICE COMPRISING PORTABLE TRANSMITTER IN WHICH ID CODE IS REGISTERED AFTER MANUFACTURING

BACKGROUND OF THE INVENTION

1. Field of the Invention

The present invention relates to a communication device and, particularly, to a communication device comprising a portable transmitter in which an ID (identification) code is registered by a user or the like after manufacturing, wherein a device to be controlled is controlled when an information signal containing an ID code is transmitted from the portable transmitter and the ID code contained in the information signal received by a receiver coincides with a registered reference code.

2. Description of the Related Art

Heretofore, a car keyless entry device has been known as a communication device which consists of a portable transmitter and a receiver and functions such that when the portable transmitter transmits an information signal containing an ID code, the receiver extracts the ID code from its received information signal, and a device to be controlled is controlled based on the received information signal when the ID code coincides with a reference code registered in the receiver.

This keyless entry device consists of more than one portable transmitter carried by each user who uses the keyless entry device and one receiver which is installed in a car and activated by the operation of these portable transmitters.

In this type of communication device, such as the above described keyless entry device, when an information signal is transmitted from the portable transmitter to the receiver, an ID code is also transmitted. This ID code is stored in the ID code storage unit of the portable transmitter and the same ID code is stored in the reference code storage unit of the receiver as a reference code.

The communication device using this ID code is available in a type (type 1) which stores respective codes in the ID code storage unit of the portable transmitter and the reference code storage unit of the receiver by inputting from a directly connected external line and a type (type 2) which stores an ID code in the ID code storage unit of the portable transmitter by inputting from a directly connected external line, transmits the ID code of the portable transmitter to the receiver and stores the received ID code in the reference (ID) code storage unit of the receiver as a reference code.

In the above already known keyless entry device, different ID codes must be prepared and written to the ID code storage units of the portable transmitter and the receiver of the type 1 and the portable transmitter of the type 2 in the production process, thereby complicating the production process. In the production process, an information transmission test is made on the portable transmitter and the receiver. For the type 1, the test must be made on each set of the transmitter and the receiver having the same ID code. For the type 2, the test must be made after the ID code of the portable transmitter is transmitted to the receiver and written to the receiver as a reference code.

SUMMARY OF THE INVENTION

In view of the above technical background, it is an object of the present invention to provide a communication device which can reduce the time and labor of the production process.

To attain the above object, the communication device of the present invention comprises a portable transmitter which comprises at least one operation switch, an ID code storage unit in which a ID code is registered, a first control unit and a transmission unit, and a receiver which comprises a receiving unit, a reference code storage unit in which at least one reference code is registered, a second control unit and a control signal generating unit capable of generating a plurality of control signals, the portable transmitter transmitting an information signal containing an ID code, the receiver comparing the ID code contained in the received information signal with the reference code, and the control signal generating unit supplying a control signal to a device to be controlled when they coincide with each other, wherein the portable transmitter comprises ID registration mode setting means, an ID code corresponding to the operation procedure of the operating switch is formed and registered in the ID code storage unit when the first control unit is set to an ID registration mode by the ID registration mode setting means and the operation switch is operated multiple times within a predetermined ID registration mode time, and a test ID code common to a plurality of portable transmitters is already registered in the ID code storage unit.

According to the above constitution, the ID code of the portable transmitter can be set by the operation of the operation switch of the portable transmitter after the communication device is manufactured and the test ID code is registered in advance. Therefore, an information transmission test can be made between portable transmitters and one receiver in the production process. Since the ID code can be set by the operation of the operation switch of the portable transmitter, the user of a keyless entry device can register an ID code by himself. Since the manufacturer may simply mass-produce exactly the same portable transmitters, the management of the products is easy.

To attain the above object, the communication device of the present invention supplies only a specific control signal when the above test ID code is used.

According to the above constitution, when the user does not register a new ID code in the portable transmitter and when the user cannot register a new ID code due to some improper operation though the user has registered the new ID code in the portable transmitter, information transmission is carried out using the test ID code. However, as the test ID code can supply only a specific control signal to a device to be controlled, the control of the entire device cannot be carried out using the test ID code. As a result, a new ID code is registered in the portable transmitter.

To attain the above object, the communication device of the present invention is constituted such that after an ID code is registered, the test ID code is invalidated.

According to the above constitution, when an ID code is registered, information transmission using the test ID code is not carried out. Therefore, it is possible to prevent the operation of a receiver in which the test ID code is registered other than the receiver of the user by the transmission of the test ID code when the user operates the portable transmitter.

The above and other objects, advantages and features of the present invention will become apparent from the following description when taken into conjunction with the accompanying drawings.

DETAILED DESCRIPTION OF THE PREFERRED EMBODIMENTS

Preferred embodiments of the present invention will be described with reference to the accompanying drawings.

Figure 1:
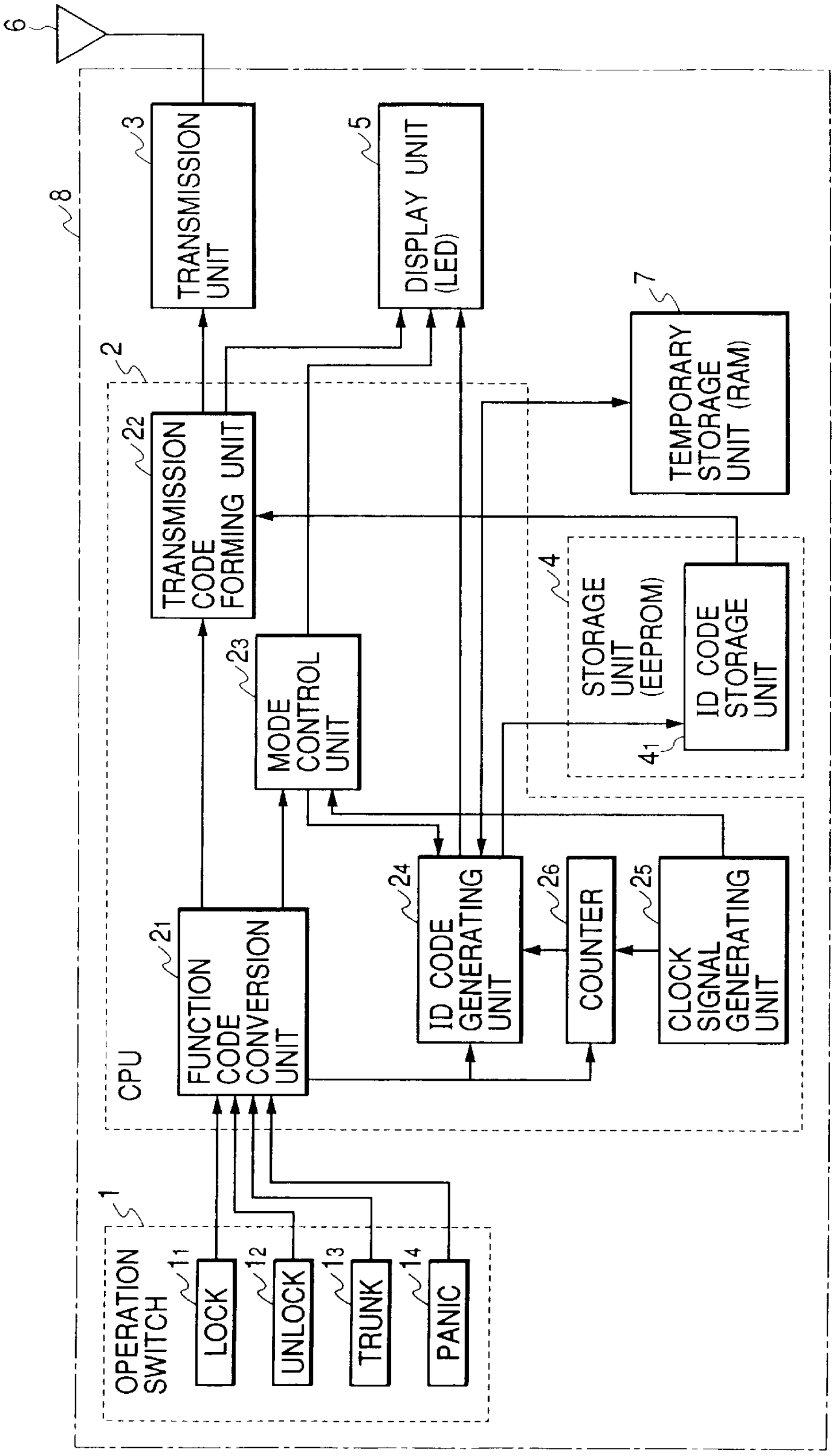
FIG. 1 is a block diagram showing the constitution of a portable transmitter in a communication device according to an embodiment of the present invention.
Figure 2:
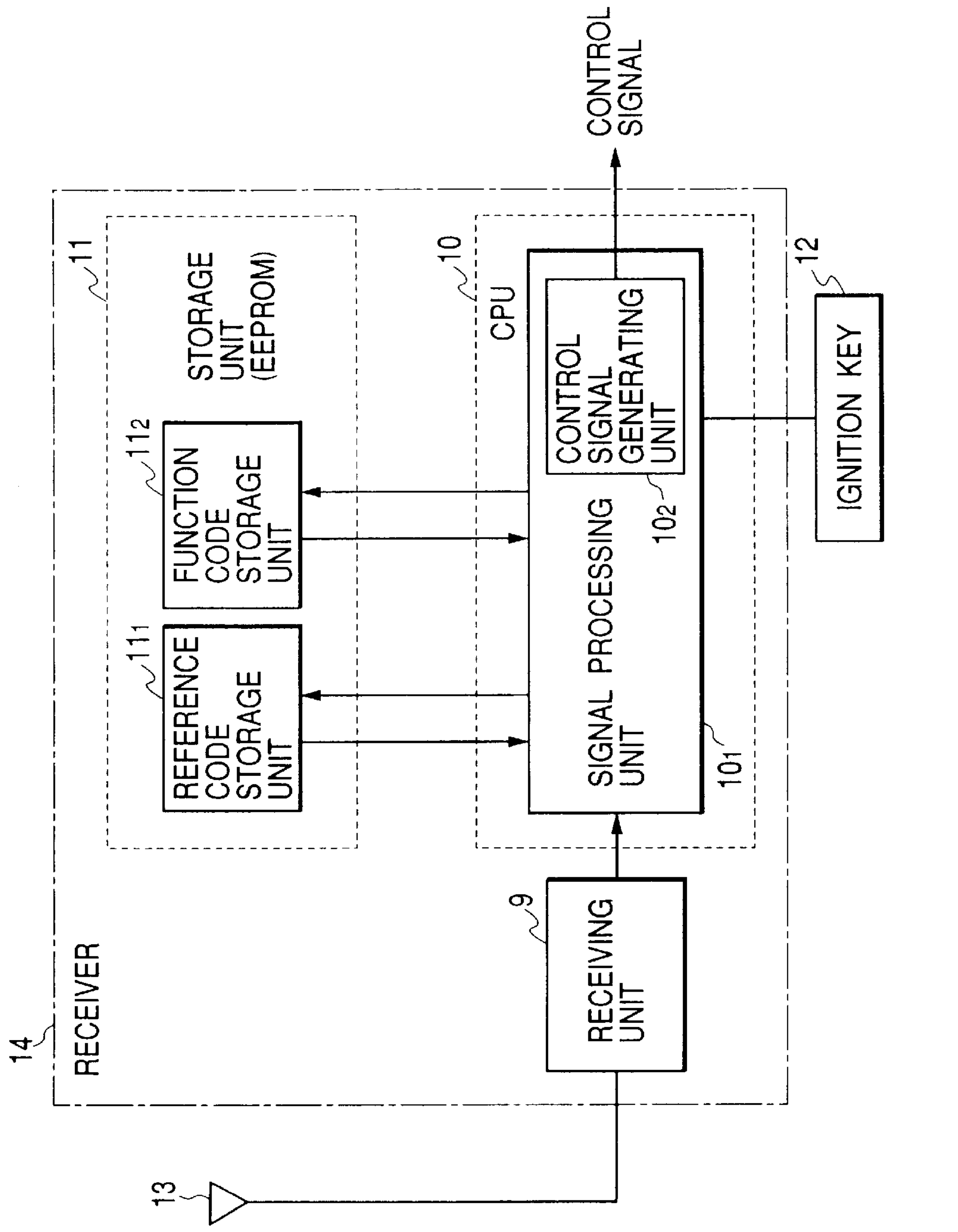
FIG. 2 is a block diagram showing the constitution of a receiver in the communication device according to the above embodiment of the present invention.

FIG. 1 and FIG. 2 are block diagrams of a communication device according to an embodiment of the present intention. FIG. 1 shows the constitution of a portable transmitter and FIG. 2 shows the constitution of a receiver.

As shown in FIG. 1, the portable transmitter 8 comprises an operation switch unit 1 having more than one operation switch, control unit (CPU) 2, transmission unit 3, storage unit 4, temporary storage unit (RAM) 7, display unit (LED) 5 and transmission antenna 6. In this case, the operation switch unit 1 comprises a door lock switch $\mathbf{1}_1$, door unlock switch $\mathbf{1}_2$, truck opening switch $\mathbf{1}_3$ and panic switch $\mathbf{1}_4$. The control unit 2 comprises a function code conversion unit $\mathbf{2}_1$, transmission code forming unit $\mathbf{2}_2$, mode control unit $\mathbf{2}_3$, ID code generating unit $\mathbf{2}_4$, clock signal generating unit $\mathbf{2}_5$ and counter $\mathbf{2}_6$. The storage unit 4 incorporates an ID code storage unit $\mathbf{4}_1$ and the display unit 5 comprises at least one light emission diode (LED). The operation switch unit 1 comprising plural operation switches $\mathbf{1}_1$ to $\mathbf{1}_4$ and the mode control unit $\mathbf{2}_3$ constitute ID registration mode setting means.

The operation switch unit 1, control unit 2, transmission unit 3, storage unit 4, RAM 7, display unit 5 and transmission antenna 6 are connected as shown in FIG. 1. The door lock switch $\mathbf{1}_1$, door unlock switch $\mathbf{1}_2$, trunk opening switch $\mathbf{1}_3$ and panic switch $\mathbf{1}_4$ of the operation switch unit 1 are connected as shown in FIG. 1, the function code conversion unit $\mathbf{2}_1$, transmission code forming unit $\mathbf{2}_2$, mode control unit $\mathbf{2}_3$, ID code generation unit $\mathbf{2}_4$, clock signal generating unit $\mathbf{2}_5$ and counter $\mathbf{2}_6$ of the control unit 2 are connected as shown in FIG. 1, and the ID code storage unit $\mathbf{4}_1$ of the storage unit 4 is also connected as shown in FIG. 1.

As shown in FIG. 2, the receiver 14 comprises a receiving unit 9, control (CPU) unit 10, storage unit (EEPROM) 11 and receiving antenna 13 and a signal from an external ignition key 12 is input into the receiver 14. In this case, the control unit 10 incorporates a signal processing unit $\mathbf{10}_1$ which incorporates a control signal generating unit $\mathbf{10}_2$. The storage unit 11 is an EEPROM and incorporates a reference (ID) code storage unit $\mathbf{11}_1$ and function code storage unit $\mathbf{11}_2$.

The receiving unit 9, control unit 10, storage unit 11, ignition key 12 and receiving antenna 13 are connected as shown in FIG. 2. The signal processing unit $\mathbf{10}_1$ and control signal generating unit $\mathbf{10}_2$ of the control unit 10 are connected as shown in FIG. 2, and the reference code storage unit $\mathbf{11}_1$ and function code storage unit $\mathbf{11}_2$ of the storage unit 11 are also connected as shown in FIG. 2.

A test ID code is registered in the ID code storage unit $\mathbf{4}_1$ of the portable transmitter 8 prior to the information transmission test of the production process. As for the registration of the test ID code, the test ID code is registered simultaneous with the writing of a program to the control unit (CPU) 2, or the test ID code is written from an external computer through a connection terminal on a printed circuit board (PCB) having the control unit (CPU) 2 mounted thereon.

In the portable transmitter 8 and the receiver 14 constituted as described above, an ID code is not registered in the ID code storage unit $\mathbf{4}_1$ of the portable transmitter 8 and a reference (ID) code is not registered in the reference code storage unit $\mathbf{11}_1$ of the receiver 14 when the user acquires (purchases) the communication device. Therefore, the user must register an ID code in the ID code storage unit $\mathbf{4}_1$ of the portable transmitter 8 and a reference (ID) code in the receiver 14 using the portable transmitter 8 in which the ID code has been registered before the user uses the portable transmitter 8 and the receiver 14.

A description is subsequently given of the operation of the communication device when an information signal is transmitted between the portable transmitter 8 and the receiver 14 and the device to be controlled of a car is operated.

The operation (operation using a new ID code) of the communication device when an ID code is first registered in the ID code storage unit $\mathbf{4}_1$ of the portable transmitter 8 by the user or the like and a reference code corresponding to the ID code is registered in the reference code storage unit $\mathbf{11}_1$ of the receiver 14 by the user or the like is as follows.

When the user operates a desired operation switch of the operation switch unit 1, for example, the door lock switch $\mathbf{1}_1$ for locking the door of a car, lock switch information indicative of the operation is output from the door lock switch $\mathbf{1}_1$ and supplied to the function code conversion unit $\mathbf{2}_1$ of the control unit 2. The function code conversion unit $\mathbf{2}_1$ converts the lock switch information into a function code when it receives the lock switch information and supplies it to the transmission code forming unit $\mathbf{2}_2$. The transmission code forming unit $\mathbf{2}_2$ reads the ID code registered in the ID code storage unit $\mathbf{4}_1$ of the storage unit 4 when it receives the function code and forms a transmission code by adding the ID code read for the function code, first code, final code and the like and supplies the formed transmission code to the transmission unit 3. The transmission unit 3 forms a transmission signal carrying the supplied transmission code on a radio signal such as an electric wave and transmits this transmission signal from the transmission antenna 6.

Meanwhile, when the receiver 14 receives the transmission signal from the portable transmitter 8 through the receiving antenna 13, it supplies the signal as a received signal to the receiving unit 9 which in turn regenerates the transmission code contained in the received signal and supplies the obtained transmission code to the signal processing unit $\mathbf{10}_1$ of the control unit 10. The signal processing unit $\mathbf{10}_1$ extracts the ID code contained in the supplied transmission code and compares the extracted ID code with the reference code registered in the reference code storage unit $\mathbf{11}_1$ of the storage unit 11. When the ID code coincides with the reference code, the signal processing unit $\mathbf{10}_1$ collates the function code contained in the transmission code with function codes stored in the function code storage unit $\mathbf{11}_2$ of the storage unit 11 and when a corresponding function code is found by the collation, the control signal generating unit $\mathbf{10}_2$ generates a control signal corresponding to the function code, for example, a door lock control signal for locking the door of a car in this embodiment. This door lock control signal is supplied to the door drive unit of the car and the door is locked.

When the user operates other operation switch, for example, the unlock switch $2_2$ for unlocking the door of the car of the operation switch unit 1 or when the user operates the trunk opening switch $1_3$ for opening the trunk of the car, a door unlock control signal or a trunk opening control signal is generated from the control signal generating unit $10_2$ by almost the same operation procedure as the above-described operation procedure, respectively. The door unlock control signal is supplied to the door drive unit of the car to unlock the door and the trunk opening control signal is supplied to the trunk locking unit of the car to unlock the trunk.

Figure 3:
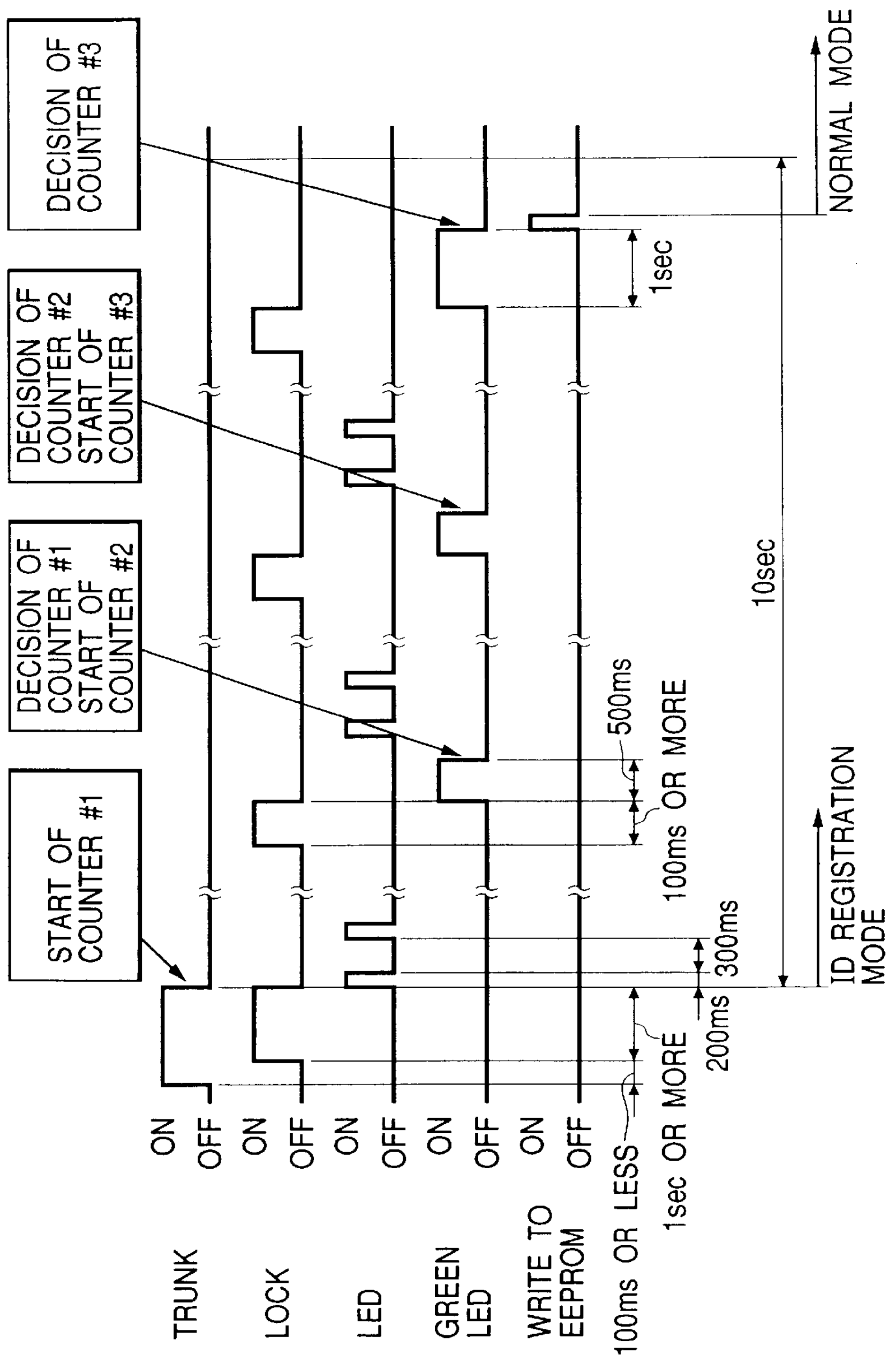
FIG. 3 is a diagram for explaining an example of operation procedures for registering an ID code in an ID code storage unit in the portable transmitter of FIG. 1.

FIG. 3 is a diagram for explaining an example of operation procedure for registering an ID code in the ID code storage unit $4_1$ of the portable transmitter 8 shown in FIG. 1.

The operation of registering the ID code in the ID code storage unit $4_1$ of the portable transmitter 8 will be described with reference to the illustration of FIG. 3.

When the user carries out predetermined operations using more than one operation switch of the operation switch unit 1 of the portable transmitter 8, for example, operates the trunk opening switch $1_3$ first, the trunk opening switch $1_3$ and the door lock switch $1_1$ for more than 1 second in less than 100 msec after the above operation, and stops the operation of the trunk opening switch $1_3$ and the door lock switch $1_1$, the mode control unit $2_3$ detects the predetermined operations and sets the control unit 2 to an ID registration mode. When the control unit 2 is set to the ID registration mode, the counter $2_6$ is reset and the first-time counting of a clock signal supplied from the clock signal generating unit $2_5$ is started and at the same time, a first pulse signal is supplied from the mode control unit $2_3$ to one LED, for example, red LED of the display unit 5. The red LED lights up multiple times for a time duration of 200 msec at intervals of 500 msec by the supply of the first pulse signal, informing the user that the portable transmitter 8 is set to the ID registration mode. The intermittent lighting of the red LED continues while the portable transmitter 8 is set to the ID registration mode.

When the user operates the latter switch of the operation switch unit 1 of the portable transmitter 8, for example, the door lock switch $1_1$ for 100 msec or more and then stops the operation of the door lock switch $1_1$, a second pulse signal is supplied from the ID code generating unit $2_4$ to another LED, for example, green LED of the display unit 5. The green LED lights up once for 500 msec in response to the supplied second pulse signal. When the lighting of the green LED ends, the first-time count value of the clock signal of the counter $2_6$ is decided by the ID code generating unit $2_4$ and the decided count value is supplied to the RAM 7, a temporary storage device, from the ID code generating unit $2_4$. At this point, the counter $2_6$ is reset and the second-time counting of a clock signal supplied from the clock signal generating unit $2_5$ is started and at the same time, a first pulse signal is supplied to the red LED from the ID code generating unit $2_4$ multiple times and the red LED lights up intermittently as in the previous case.

Thereafter, when the user operates the door lock switch $1_1$ for more than 100 msec again and then stops the operation of the door lock switch $1_1$, the second pulse signal is supplied to the green LED again from the ID code generating unit $2_4$ to light up the green LED just once for 50 msec. When the lighting of the green LED ends, the second-time count value of the clock signal of the counter $2_6$ is decided by the ID code generating unit $2_4$ and the decided count value is supplied from the ID code generating unit $2_4$ to the RAM 7. At this point, the counter $2_6$ is reset, the third-time counting of the clock signal is started and the red LED lights up intermittently.

Subsequently, when the user operates the door lock switch $1_1$ three times for more than 100 msec and then stops the operation of the door lock switch $1_1$, the second pulse signal is supplied to the green LED from the ID code generating unit $2_4$ to light up the green LED just once for 1 sec which is longer than the total time duration of the previous two times of lighting. When the lighting of the green LED ends, the third-time count value of the clock signal of the counter $2_6$ is decided by the ID code generating unit $2_4$ and the decided count value is supplied to the RAM 7 from the ID code generating unit $2_4$, and the above three count values are read from the RAM 7 and registered in the ID code storage unit $4_1$ together.

In this case, the above three count values stored in the RAM 7 are stored in three 8-bit areas separately and one of 256 data values from "00000000" to "11111111" is stored in each area.

The first-time count value of the clock signal after the counter $2_6$ is reset changes from "00000000" to "11111111" each time the clock signal is applied, reaches "11111111", returns to "00000000" and then changes from "00000000" to "11111111" again. The count value of the counter $2_6$ when the first-time lighting of the green LED ends is stored in the first area of the RAM 7.

Thereafter, the second-time and third-time count values of the clock signal after the counter $2_6$ is reset are the same as described above. The count value of the counter $2_6$ after the second-time lighting of the green LED ends is stored in the second area of the RAM 7 and the count value of the counter $2_6$ after the third-time lighting of the green LED ends is stored in the third area of the RAM 7.

When the count values are stored in the three area of the RAM 7, the ID code generating unit $2_4$ reads the count values from the RAM 7 immediately, combines them into a 24-bit continuous code as an ID code and registers it in the ID code storage unit $4_1$.

Thus, the count values stored in the RAM 7 are set at random according to the operation timing of the switch carried out by the user and the set values cannot be selected optionally. Therefore, probability that an ID code formed by combining these count values and registered in the portable transmitter 40 coincides with an ID code registered in another portable transmitter is extremely small, thereby making it possible to obtain portable transmitters having no compatibility with one another.

When 10 sec passes after the control unit 2 is set to the ID registration mode, the control unit 2 of the portable transmitter 8 automatically returns to a normal mode from the ID registration mode and the lighting of the red LED of the display unit 5 ends.

As shown in FIG. 3, when the third-time count value is decided, the third-time lighting of the green LED ends, and the registration of the ID code ends, the control unit 2 returns to the normal mode from the ID registration mode even before 10 sec passes after it is set to the ID registration mode.

Figure 4:
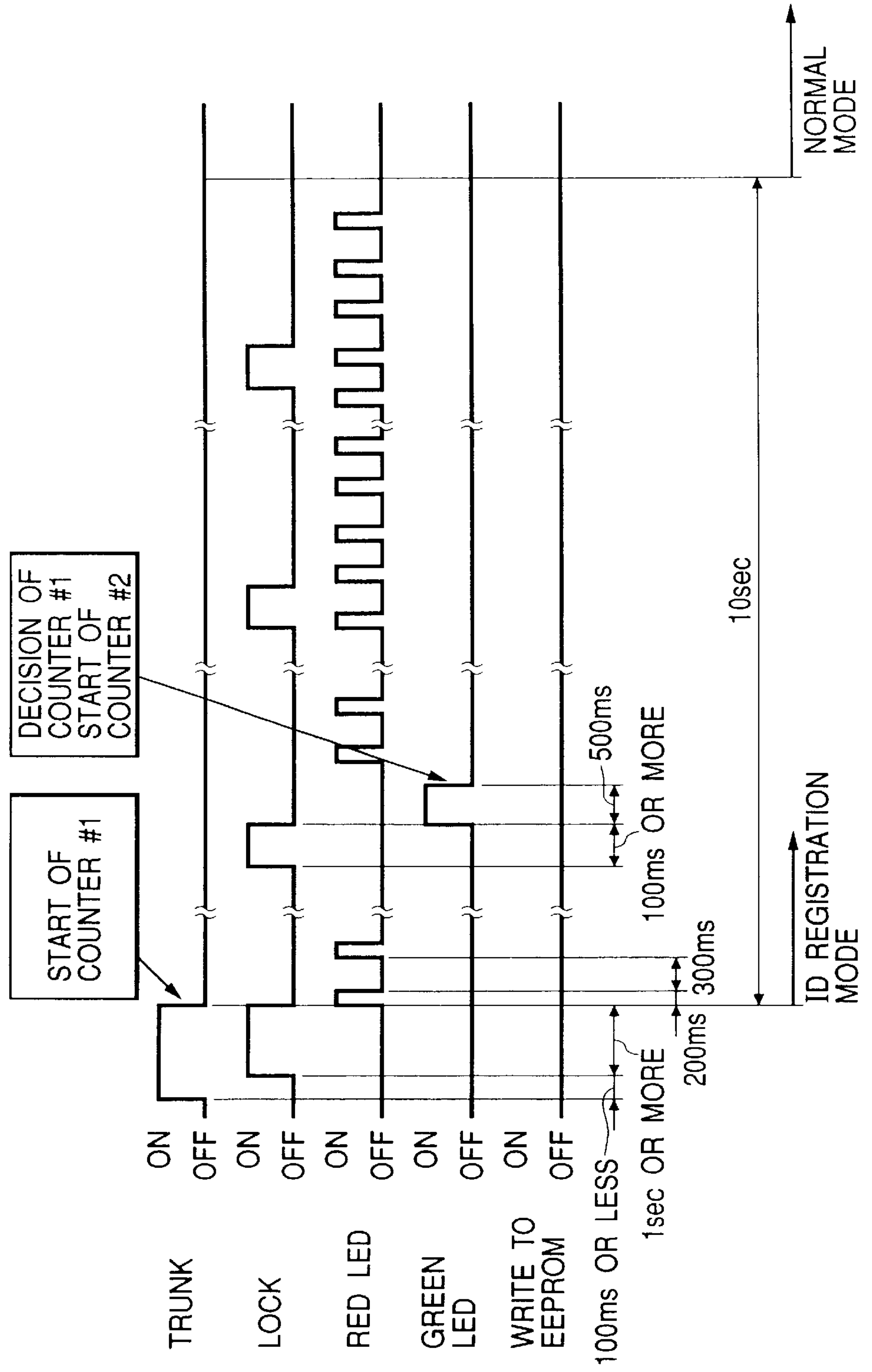
FIG. 4 is a diagram for explaining operation when an ID code cannot be registered in the ID code storage unit of the portable transmitter shown in FIG. 1 at the time of registering the ID code.

Thereafter, FIG. 4 is a diagram for explaining the operation of the communication device when an ID code cannot be registered in the ID code storage unit 4 of the portable transmitter 8 at the time of registering the ID code.

The operation of the communication device when the ID code cannot be registered will be described with reference to FIG. 4.

As shown in FIG. 4, the operation procedure until the control unit 2 of the portable transmitter 8 is set to the ID registration mode is the same as the operation procedure shown in FIG. 3 which has been described for testing.

When the user stops the operation of the door lock switch $\mathbf{1}_1$ after the user operates the door lock switch $\mathbf{1}_1$ for more than 100 msec, the second pulse signal is supplied from the ID code generating unit $\mathbf{2}_4$ to the green LED of the display unit 5 and the green LED lights up for 500 msec. When the lighting of the green LED ends, the first-time count value of the clock signal of the counter $\mathbf{2}_6$ is decided by the ID code generating unit $\mathbf{2}_4$and the decided count value is stored in the RAM 7 from the ID code generating unit $\mathbf{2}_4$. At this point, the counter $\mathbf{2}_6$ is reset, the second-time counting of the clock signal is started, and the red LED lights up intermittently.

Thereafter, when 10 sec passes after the control unit 2 is set to the ID registration mode without the operation of the door lock switch $\mathbf{1}_1$ by the user, the control unit 2 automatically returns to the normal mode from the ID registration mode. Since the first-time count value of the clock signal is decided and the second-time and third-time count values are not decided at this point, the ID code generating unit $\mathbf{2}_4$ discards the first-time count value stored in the RAM and does not register an ID code in the ID code storage unit $\mathbf{4}_1$.

The non-registration of an ID code in the ID code storage unit $\mathbf{4}_1$ also occurs when the control unit 2 automatically returns to the normal mode from the ID registration mode after the first-time and second-time count values are decided.

Figure 5:
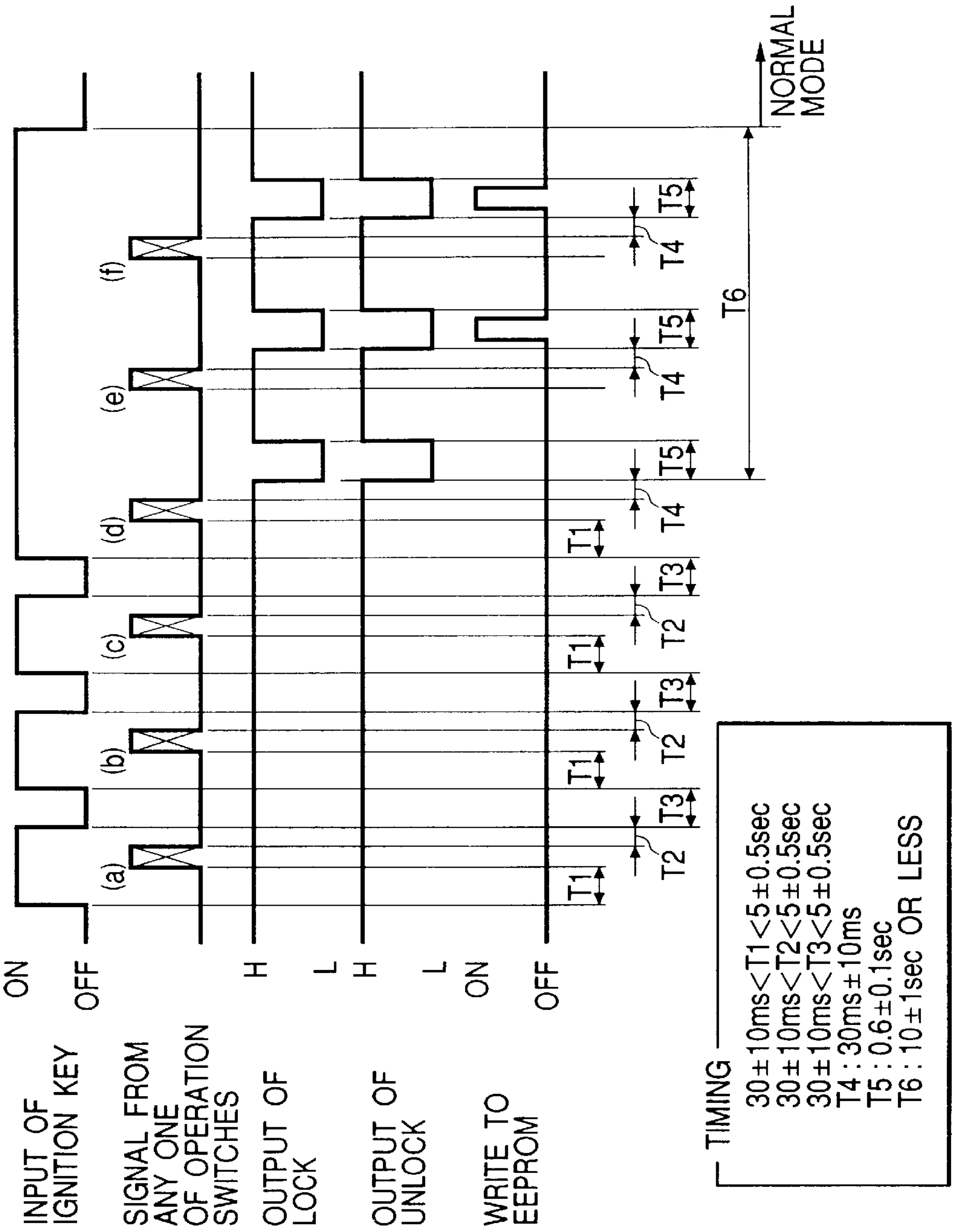
FIG. 5 is a diagram for explaining an example of operation for registering a reference code in the reference code storage unit of the receiver using the portable transmitter.

FIG. 5 is a diagram for explaining an example of operation procedure when a reference code is registered in the reference code storage unit $\mathbf{11}_1$ of the receiver 14 using the portable transmitter 8.

The operation procedure for registering a reference code in the reference code storage unit $\mathbf{11}_1$ of the receiver 14 will be described with reference to FIG. 5.

The user carries the portable transmitter 8 and supplies a key input pulse to the signal processing unit $\mathbf{10}_1$ by changing the ignition key 12 of the car from an accessory (ACC) position to an on (ON) position. Then, the user operates any one of the switches of the operation switch unit 1 of the portable transmitter 8 in less than a time T1 after the key input pulse is supplied to the signal processing unit $\mathbf{10}_1$, converts an ID code "a" obtained by the operation into a transmission code and transmits it from the portable transmitter 8 as a transmission signal. The receiver 14 receives this transmission signal with the receiving unit 9 and supplies it to the signal processing unit $\mathbf{10}_1$ to extract the ID code "a" contained in the transmission code. Thereafter, the user changes the ignition key 12 from the ON position to the ACC position in less than a time T2 after the user terminates the operation of the switch to stop the supply of the key input pulse to the signal processing unit $\mathbf{10}_1$. At this point, the operation returns to the original state, thereby ending the first operation cycle.

Thereafter, the user operates the ignition key 12 and the switch of the portable transmitter 8 again like the first operation cycle in less than a time T3 after the supply of the key input pulse in the first operation cycle stops and goes through the same operation process as in the first operation cycle, thereby ending the second operation cycle.

Subsequently, the same operation is carried out in the third operation cycle and the fourth operation cycle. In this case, in the fourth operation cycle, the operation of extracting an ID code "d" contained in a transmission code by the signal processing unit $\mathbf{10}_1$ in less than the time T1 after the supply of the key input pulse is started is the same as in the first to third operation cycles. However, the operation mode of the control unit 10 including the signal processing unit $\mathbf{10}_1$ is changed from the normal operation mode to an ID code writing mode when a time T4 passes after the supply of the ID code "d" is stopped, thereby making it possible to write an ID (reference) code thereafter.

The operation procedure for writing this ID (reference) code is as follows.

After the operation mode of the control unit 10 is changed to the ID code writing mode, the user operates the portable transmitter 8 for writing an ID code to transmit a transmission code including an ID code "e" to the receiver 14 as a transmission signal. When the transmission code containing the ID code and function code "e" is supplied during the supply of the key input pulse, the signal processing unit $\mathbf{10}_1$ of the receiver 14 supplies the ID code contained in the transmission code to the reference code storage unit $\mathbf{11}_1$ in less than a time T4 after the supply of the transmission code is stopped and writes the first ID (reference) code in the reference code storage unit $\mathbf{11}_1$. At this point, the user is informed that the ID (reference) code is written properly by the continuance of a door lock state or door unlock state for a time T5.

Thereafter, to write the ID (reference) code (second ID code) of another portable transmitter 8, the user operates this portable transmitter 8 as described above to write the second ID (reference) code in the reference code storage unit $\mathbf{11}_1$.

When there is another portable transmitter 8 to which an ID (reference) code is to be written, the ID (reference) code is written to the reference code storage unit $\mathbf{11}_1$ with the same operation procedure as the above-described operation procedure for writing the ID (reference) code.

In this case, the control unit 10 automatically returns from the ID code writing mode to the normal operation mode when the set time T6 of the ID code writing mode passes.

A description is subsequently given of the operation (operation using a test ID code) of the communication device when an ID code is not registered in the ID code storage unit $\mathbf{4}_1$ of the portable transmitter 8, a test ID code is still registered in the ID code storage unit $\mathbf{4}_1$ and a test reference code corresponding to the test ID code is registered in the reference code storage unit $\mathbf{11}_1$ of the receiver 14 in the production process.

In this case, even when the test ID code coincides with the test reference code at the time of collation with a test reference code, it functions to cause only a specific control signal, for example, a door lock control signal to be selectively output to the device to be controlled of the car and prevent the output of other control signals such as a door unlock control signal and trunk opening control signal.

When an inspector operates a desired operation switch of the operation switch unit 1, for example, the door lock switch $\mathbf{1}_1$ for locking the door of the car, the operation is almost the same as operation when a new ID code is used as previously explained, a door lock control signal for locking the door of the car is generated from the control signal generating unit $\mathbf{10}_2$ and supplied to the door drive unit of the car to lock the door. Thereby, the transmission function of the portable transmitter 8 is checked.

In contrast to this, when the operator operates an operation switch other than the door lock switch $\mathbf{1}_1$ of the operation switch unit 1, for example, the door unlock switch $\mathbf{1}_2$ for unlocking the door of the car, the operation of the portable transmitter 8 which forms a transmission code and transmits it as a transmission signal and the operation of the receiver 14 which receives the transmission signal, extracts the transmission code from the received signal, and collates the function code contained in-the transmission code with the function code registered in the function code storage unit $\mathbf{11}_2$ when the test ID code contained in the transmission code coincides with the test reference code registered in the reference code storage unit $\mathbf{11}_1$ are almost the same as the operation using the new ID code which has been already described. Even when the function codes coincide with each other, the signal processing unit $\mathbf{10}_1$ does not judge that the code is the test ID code and the control signal generating unit $\mathbf{10}_2$ does not generate a control signal corresponding to the function code, that is, a door unlock control signal.

Further, the same shall apply even when the operator operates an operation switch other than the door lock switch $\mathbf{11}_1$ of the operation switch unit 1, such as the trunk opening switch $\mathbf{1}_3$ or the panic switch $\mathbf{1}_4$. That is, the control signal generating unit $\mathbf{10}_2$ does not generate a trunk opening control signal or the like.

In this case, when a new ID code is registered by the user or the like according to the predetermined operation procedure as described in the foregoing, the test ID code registered in the ID code storage unit $\mathbf{4}_1$ of the portable transmitter 8 is superscribed by the new ID code and thereby invalidated, and only the new ID code is registered in the ID code storage unit $\mathbf{4}_1$. Similarly, when a new reference code is registered according to the predetermined operation procedure as described in the foregoing, the test reference code registered in the reference code storage unit $\mathbf{11}_1$ of the receiver 14 is superscribed by the new reference code and thereby invalidated, and the only new reference code is registered in the reference code storage unit $\mathbf{11}_1$.

Thus, according to the communication device of this embodiment, when information is transmitted using the test ID code registered in the ID code storage unit $\mathbf{4}_1$, only a control signal specific to the device to be controlled, for example, a door lock control signal is supplied, whereby a new ID code is inevitably registered by the user or the like. As a result, compatibility between portable transmitters 8 is lost and all the functions of the portable transmitter 8 can be exhibited.

In the above embodiment, the test reference code is stored in the reference code storage unit $\mathbf{11}_1$. The test reference code may be stored in the processing program of the signal processing unit $\mathbf{10}_1$ in place of this. In this case, the receiver 14 recognizes the test ID code contained in the received signal with the processing program and generates a control signal when it receives the test ID code. In this case, the step of storing a reference code for testing a program can be omitted.

In the above embodiment, the test ID code or the test reference code is superscribed by the ID code or reference code and invalidated. The program may be constituted such that use of the test ID code or test reference code is inhibited by the registration of the ID code or reference code. According to this constitution, when a different test ID code is used for each production plant, it can be used as a code for specifying the production plant.

What is claimed is:

1. A communication device comprising:

a portable transmitter which comprises at least one operation switch, an ID code storage unit in which an ID code is registered, a first control unit and a transmission unit; and a receiver which comprises a receiving unit, a reference code storage unit in which at least one reference code is registered, a second control unit and a control signal generating unit capable of generating a plurality of control signals, wherein the portable transmitter transmits an information signal containing the ID code, the receiver compares the ID code contained in the information signal with the reference code, and the control signal generating unit supplies a control signal to a device to be controlled when the ID code and the reference code coincide with each other, further wherein a test ID code is initially registered in the ID code storage unit of the portable transmitter, the portable transmitter comprises ID registration mode setting means, and an ID code corresponding to operation procedure of at least one operation switch is formed and registered in the ID code storage unit of the portable transmitter when the first control unit is set to an ID registration mode by the ID registration mode setting means and at least one operation switch is operated multiple times, and is formed and registered ID code super-scribes any previously registered ID code.

2. The communication device according to claim 1, wherein when the test ID code is used, only one of control signals can be supplied.

3. The communication device according to claim 1, wherein the test ID code already registered in the ID code storage unit is invalidated after the ID code is registered.

4. The communication device according to claim 1, wherein the test ID code is common to a plurality of portable transmitters and is initially registered in an ID code storage unit of each of the plurality of portable transmitters.

* * * * *